(12) United States Patent
Saka et al.

(10) Patent No.: US 11,775,138 B2
(45) Date of Patent: Oct. 3, 2023

(54) EMAIL ASSISTANT OPTIONS BAR FOR EMAIL APPLICATIONS

(71) Applicant: VMware, Inc., Palo Alto, CA (US)

(72) Inventors: Ratna Paul Saka, Atlanta, GA (US); Eric Munoz, Atlanta, GA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/374,938

(22) Filed: Jul. 13, 2021

(65) Prior Publication Data
US 2023/0019290 A1   Jan. 19, 2023

(51) Int. Cl.
| G06F 3/0482 | (2013.01) |
| G06F 3/04817 | (2022.01) |
| H04L 51/00 | (2022.01) |
| G06F 3/0484 | (2022.01) |
| H04M 1/72436 | (2021.01) |
| H04M 1/72469 | (2021.01) |
| H04L 51/07 | (2022.01) |
| G06Q 10/1093 | (2023.01) |

(52) U.S. Cl.
CPC .......... *G06F 3/0482* (2013.01); *G06F 3/0484* (2013.01); *G06F 3/04817* (2013.01); *G06Q 10/1095* (2013.01); *H04L 51/00* (2013.01); *H04L 51/07* (2022.05); *H04M 1/72436* (2021.01); *H04M 1/72469* (2021.01)

(58) Field of Classification Search
CPC .. G06F 3/0482; G06F 3/04817; G06F 3/0481; G06F 3/0484; H04L 51/00; H04L 51/07; H04L 51/08; H04M 1/2746; H04M 1/72436; H04M 1/72469; H04M 1/7243; G06Q 10/1095
See application file for complete search history.

(56) References Cited

U.S. PATENT DOCUMENTS 8,886,735 B1 * 11/2014 Liu .................. G06Q 10/107 715/752
9,753,611 B2 *  9/2017 Thorsander ......... G06F 3/04883
(Continued)

OTHER PUBLICATIONS

ExtendOffice, How to attach files to meetings or appointments in Outlook?, https://web.archive.org/web/20151212021501/http://www.extendoffice.com:80/documents/outlook/1606-outlook-attach-files-to-meetings-appointments.html, Dec. 12, 2015 (Year: 2015).*

*Primary Examiner* — Nicholas Ulrich
(74) *Attorney, Agent, or Firm* — Clayton, McKay & Bailey, PC

(57) ABSTRACT

Systems and methods are described for providing an email assistant options bar. An assistant engine of an email application can identify contacts of a user profile that the user interacts with the most frequently based on a set of rules. When a user interacts with an email in the email application using a predetermined input type, the assistant engine can display the email assistant options bar. The email assistant options bar can include icons representing the identified contacts that the user interacts with the most frequently and a set of actions that can be performed to interact with the contacts. Some examples of actions can include forwarding the selected email, calling a contact, and setting up a meeting. The user can select one or more of the contacts and one of the actions. The assistant engine can perform the selected action with the selected contact as the recipient.

20 Claims, 4 Drawing Sheets

(56) References Cited

U.S. PATENT DOCUMENTS

| | | | | |
|---|---|---|---|---|
| 2013/0293496 | A1* | 11/2013 | Takamoto | G06F 3/0482 |
| | | | | 345/173 |
| 2015/0095430 | A1* | 4/2015 | Kaushik | G06Q 10/101 |
| | | | | 709/206 |
| 2017/0126755 | A1* | 5/2017 | Singh | H04L 67/06 |
| 2018/0285406 | A1* | 10/2018 | Shah | G06Q 10/063116 |
| 2019/0197427 | A1* | 6/2019 | Hwang | G06N 20/00 |
| 2021/0105147 | A1* | 4/2021 | Waugh | H04L 67/535 |
| 2022/0318760 | A1* | 10/2022 | Renavikar | G06Q 10/1095 |

\* cited by examiner

EMAIL ASSISTANT OPTIONS BAR FOR EMAIL APPLICATIONS

BACKGROUND

Email communication continues to provide an important avenue for workplace communication. In the enterprise environment, recipients often perform follow-up actions in response to receiving the email. For example, the recipient can forward the email, make a phone or video call, or schedule a meeting. In one example, the recipient can start a web conference.

With today's email clients, it can require several clicks and navigating to different screens to perform these follow-up actions. For example, to forward an email, a user must typically select an email, enter an email details screen, click on a forward button causing a new window to appear, select the recipient's email address, and then select to forward the email. These extra steps cause inefficiencies in an employee's workflow.

Most enterprise workers perform very high numbers of email-based interactions each day. Therefore, the potential for distraction and the cumulative amount of wasted time can be high. This is particularly true when the same basic response or communication needs to be sent numerous times, such as to alert numerous co-workers or clients regarding a sick day. The same issues exist for setting up video conferences and other meetings, which can require cumbersome navigation and clicks.

As a result, a need exists for an email system that reduce the number of steps required to perform follow-up actions after receiving an email.

SUMMARY

Examples described herein include systems and methods for providing an email assistant options bar (also referred to as an "email options bar" or just "options bar") in a graphical user interface ("GUI") of an email application. The options bar can visually display contacts, such as with representative icons, and action options for a communication. Example action options can include sending an email (including a template), placing a call, or setting up a video conference. Selecting a combination of contact icons and an action can be done all on one screen with a few clicks or touches, resulting in creation of the communication much more efficiently than normal. The options bar can visually display as part of the email inbox, in an example.

In an example, an assistant engine can be responsible for executing the email options bar. The assistant engine can be part of the email application or provided as an add-on software component. The assistant engine can include a set of rules for identifying contacts to include in the email options bar. Contacts can correspond to other people that the user communicates with. For example, the contacts can be entries in a virtual address book of the user. The contacts can include contact information like a name, email address, phone number, address, and so on.

In an example, the assistant engine can apply the rules to communications between the user and the contacts to identify the contacts that the user interacts with the most frequently. For example, the assistant engine can determine the number of emails the user sent to each contact, the number of emails received from each contact, the number of phone calls with each contact, the number of video calls the user and each contact were on together, and the number of in-person meetings the user and each contact confirmed attending. These are merely examples and are not intended to be an exhaustive list of interaction types. In one example, the assistant engine can assign weights to each interaction type and calculate a score for each contact. In another example, the interactions can be analyzed over a predetermined time period, such as the previous week, month, or year. In one example, the user can modify the contacts that appear in the options bar, such as by selecting a contact to always appear regardless of the interaction frequency with that contact.

In some examples, the assistant engine can select contacts for the options bar based on criteria unrelated to interaction frequency. For example, the assistant engine can identify contacts that the user has most recently interacted with. As an example, the assistant engine can identify the last five contacts the user has emailed, or the last five contacts the user has emailed or received an email from. Although five contacts are one example of the number of identified contacts, other contact amounts can be used, such as three or seven.

In an example, the assistant engine can display the options bar in response to a predetermined input type from the user, such as a long press on an email. The options bar can include icons corresponding to the contacts that the user interacts with the most frequently and a set of action options. Action options can be icons corresponding to actions that the user can select to interact with the contacts in the options bar. For example, the user can select one or more contacts on the options bar and then select an action. The assistant engine can then perform the selected action with the selected contact or contacts as the intended recipient. As some examples, action options can include forwarding the email to the selected contact, calling the selected contact, scheduling a meeting with the selected contact, sending a new email to the selected contact, and starting a web conference with the selected contacts. In one example, the action options can include sending an email to the selected client using an email template. For example, the assistant engine can provide an interface that allows the user to create an email template. The assistant engine can then include an icon on the options bar for sending an email to the selected contacts using the template. In one example, the available action options can correspond to actions that the email application can perform.

In one example, the user can select multiple emails. For example, the user can use the predetermined input type to display the options bar for an email. The user can select contacts and an action option for scheduling or starting a meeting. The assistant engine can allow the user to select additional emails to include in a meeting invite that it sends to the selected contacts. In one example where the meeting invite is sent as an email, the additional emails can be added to the email as attachments or the additional emails can be stored in cloud storage and the email can includes links to the emails. In another example where the user schedules or initiates a web conference or other type of video call, the emails can be assistant engine can provide the emails to a web conferencing service, and the web conference service can provide the emails to the attendees through the service, such as through an Application Programming Interface ("API").

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for providing an email assistant options bar. An assistant engine of an email application can identify contacts of a user profile that the user interacts with the most frequently based on a set of rules. When a user interacts with an email in the email application using a predetermined input type, the assistant engine can display the email assistant options bar. The email assistant options bar can include icons representing the identified contacts that the user interacts with the most frequently and a set of actions that can be performed to interact with the contacts. Some examples of actions can include forwarding the selected email, calling a contact, and setting up a meeting. The user can select one or more of the contacts and one of the actions. The assistant engine can perform the selected action with the selected contact as the recipient.

Figure 1:
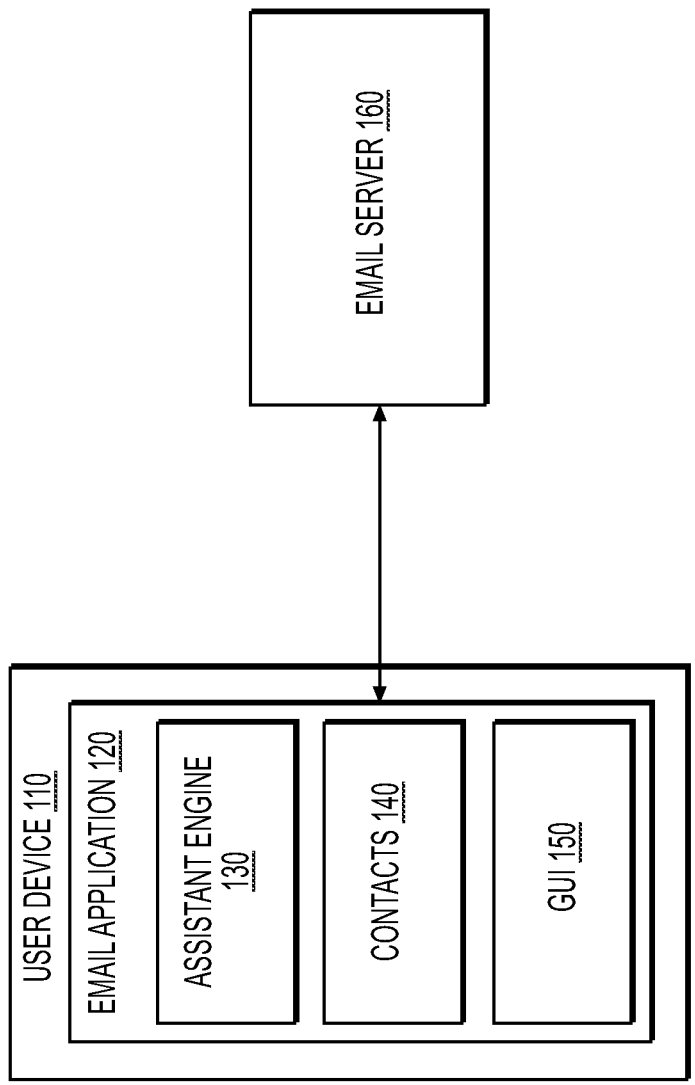
FIG. 1 is an illustration of an example system for providing an email assistant options bar.

FIG. 1 is an illustration of a system for providing an email assistant options bar. A user device 110 can execute an email application 120 that provides access to a user's mailbox and provides email functionality to the user, such as VMWARE's BOXER. The user device 110 can also include additional applications that are not shown, such as word-processing applications, productivity applications, content-viewing applications, third-party applications, and any other application that can be installed on a user device 110. The email application 120 can include a GUI 150. The GUI 150 can be an interface that displays a user's emails and allows a user to interact with the emails, such as by replying, forwarding, deleting, drafting, and organization them. The user device 110 can be any processor-enabled device, such as a phone, tablet, or laptop. The user device 110 can communicate over a network, such as the internet, with an email server 160. The email server 160 can be one or more physical hardware servers that communicates with the email client 120.

The email application 120 can include an assistant engine 130 that provides and manages an email assistant options bar. The email options bar can be a feature that simultaneously displays contacts 140 of a user and certain action options that the user can choose from to interact with the contacts 140. A contact 140 can include contact information for another user, such as the user's name, phone number, email address, department, and so on. In one example, the contacts 140 can be email or other contacts associated with the user's profile. The contacts 140 can be stored in the email application 120, on an email server 160, or both, depending on the example. In one example, the contacts 140 can be managed by another application that the email application 120 has access to.

The action options can allow the user to interact with the contacts 140 in various ways. Some examples of actions options can include forwarding an email, sending an instant message, and setting up a meeting. In one example, the action options can include sending an email to the selected client using an email template. For example, the assistant engine can provide an interface that allows the user to create an email template. The assistant engine can then include an icon on the options bar for sending an email to the selected contacts using the template.

In an example, assistant engine 130 can display the options bar in the GUI 150 in response to a predetermined input type. As an example, where the email application 120 is on a touch-screen device, the assistant engine 130 can display the options bar if the user presses on an email for longer than one second. In another example where the email application 120 is on a touch-screen device with a mouse, the assistant engine 130 can display the options bar if the user selects the email and clicks on a button associated with the options bar or right clicks and selects a menu option for the options bar.

In an example, the contacts 140 and action options can be selectable icons. For example, the user can select one or more contacts 140 in the options bar and then select an action to perform. The email application 120 can then perform the selected action with respect to the selected contacts. For example, a user can select two contacts on the options bar and then select a conference call button. This can require only three touches on the options bar, in an example, and a checkmark or other indication can appear on the selected icons. The email application 120 can then display window where the user can set up a conference call with the selected users about the email. In another example, a user can long select an email to load the options bar. The user can then select a contact in the options bar and select a forward email option. The email application 120 can then forward the email to the selected user. In one example, the assistant engine 130 can receive the selections and provide instructions to the email application 120 for performing the corresponding action.

In an example, the assistant engine 130 can determine which of the user's contacts 140 to include in the options bar. This can be done using a set of rules. The rules can be determined by the user, an administrator user, a machine learning algorithm, or a combination of these, depending on the example. For example, an administrator can set the rules so that the assistant engine 130 displays the user's contacts that the user interacts with the most frequently. The assistant engine 130 can collect data on the user's interactions with the contacts 140. For example, the assistant engine 130 can retrieve data on emails received and sent from the user's email account. This data can be retrieved from the email application 120 or the email server 160. The email server 160 can be one or more servers that hosts the user's email address and manages incoming and outgoing email messages for the email address. In an example, the assistant engine 130 can retrieve the contacts from the email server 160 using an API call. In one example, the assistant engine 130 can use the email data to identify the contacts 140 that the user exchanges emails with the most. This can be based on a predetermined time period, such as the past week, month, or year.

In an example, the contacts 140 can be chosen based on other non-email interactions. For example, the email application 120 can be part of a larger integrated system of interconnected applications and services, such as a Unified Endpoint Management ("UEM") system. The assistant engine 130 can retrieve data from a database of the system to identify other interactions with the contacts 140, such as phone calls, video conference calls, scheduled meetings, and so on. In one example, the assistant engine 130 can assign weights to interaction types and determine a weighted score for each contact 140. The contacts 140 with the highest scores can be placed in the options bar. In one example, the options bar can be limited to a maximum number of contacts 140 that can be included, such as three or five.

Figure 2:
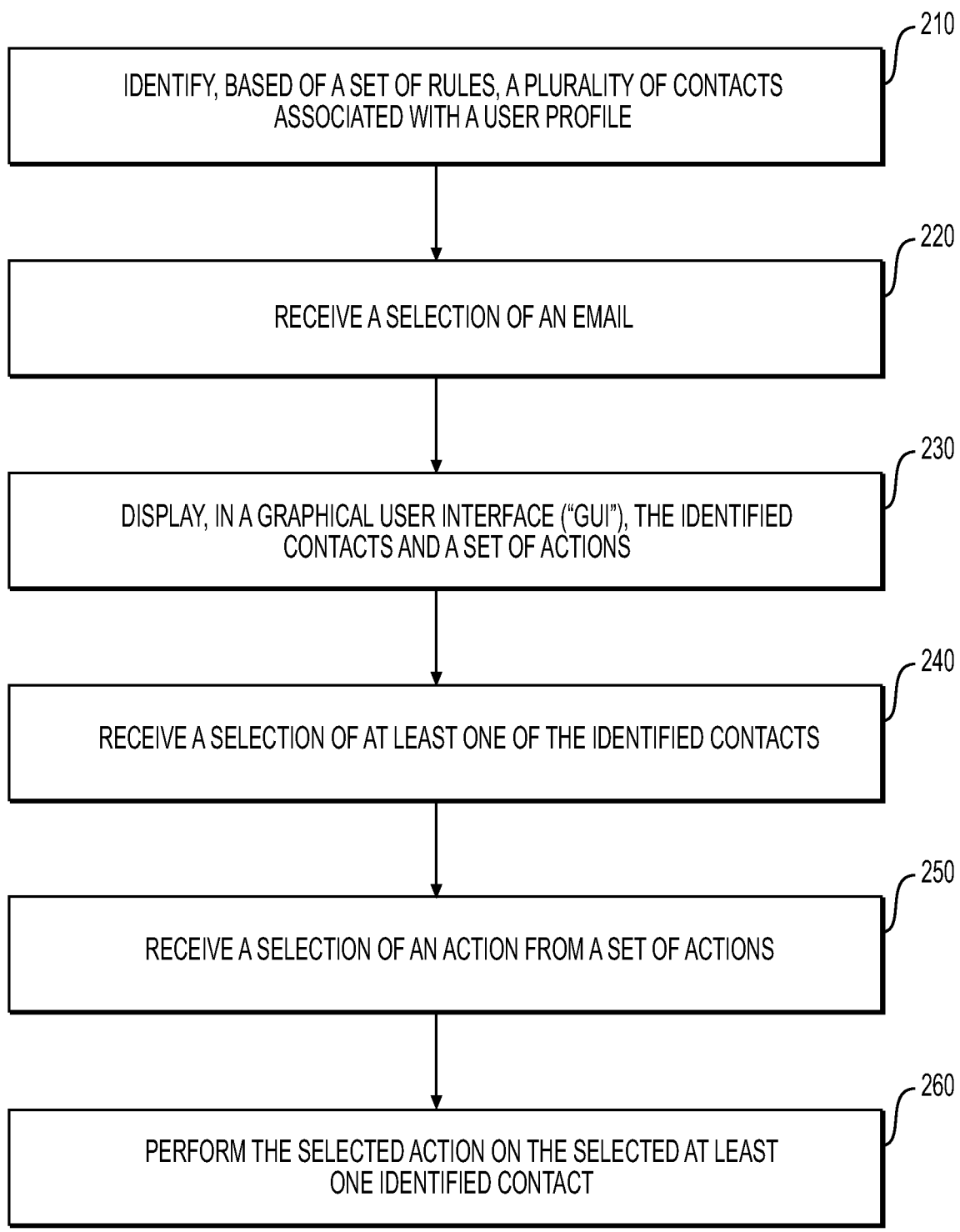
FIG. 2 is a flowchart of an example method for providing an email assistant options bar.

FIG. 2 is a flowchart of an example method for providing an email assistant options bar. At stage 210, the assistant engine 130 can identify contacts 140 associated with a user profile based on a set of rules. The rules can be used to identify which of the user's contacts 140 that the user interacts with the most frequently to insert into the options bar. The rules can be determined by the user, an administrator user, a machine learning algorithm, or a combination of these, depending on the example. For example, an administrator can set a base set of rules, a machine learning algorithm can refine the rules based on user actions, and the user can add or remove contacts 140 from the options bar manually.

In some examples, the assistant engine can select contacts for the options bar based on criteria unrelated to interaction frequency. For example, the assistant engine can identify contacts that the user has most recently interacted with. As an example, the assistant engine can identify the last five contacts the user has emailed, or the last five contacts the user has emailed or received an email from. Although five contacts are described for the number of identified contacts, other contact amounts can be used, such as three or seven.

In an example, the assistant engine 130 can collect data on the user's interactions with the contacts 140. For example, the assistant engine 130 can retrieve data on emails received and sent from the user's email account. The assistant engine 130 can count the number of emails sent to and received from each contact 140 over a predetermined time period, such as the past week, month, or year. The time period used for the count can be one of the rules. In one example, the assistant engine 130 can allow the user to set the time period using the GUI 150.

In an example, the contacts 140 can be identified based on other non-email interactions as well. For example, the assistant engine 130 can retrieve data from other services that are integrated with the email application 120. The assistant engine 130 can use the data to identify other interactions the user has with the contacts 140, such as phone calls, video conference calls, scheduled meetings, and so on. In one example, the assistant engine 130 can assign weights to interaction types and determine a weighted score for each contact 140. The contacts 140 with the highest scores can be placed in the options bar. The assistant engine 130 can also utilize an organization chart or other hierarchical information to determine which users commonly work with or report to one another. These relationships can be scored for purposes of predicting which contacts 140 to display in the options bar.

In one example, the options bar can be limited to a maximum number of contacts 140 that can be included, such as three or five. Where the maximum number is three, the assistant engine can identify the three contacts with the highest score or with whom the user has exchanged the most emails.

At stage 220, the assistant engine 130 can receive a selection of an email. In one example, the selection can be of a predetermined type. A selection of the predetermined type can indicate the user's intention to utilize the options bar. For example, where the email application 120 is on a touch-screen device, the assistant engine 130 can display the options bar if the user presses on an email for longer than one second. In another example, the user can press or long press on a button displayed next to the email in the GUI 150. In another example where the email application 120 is on a touch-screen device with a mouse, the assistant engine 130 can display the options bar if the user selects the email and clicks on a button associated with the options bar or right clicks and selects a menu option for the options bar. In contrast to these special input types, a short press, tap, or click that is shorter than one second can indicate that the user simply wishes to view the body of the email.

In one example, the email application 120 can detect the email selection corresponding to the options bar. The email application 120 can then notify the assistant engine 130. In one example, the email application 120 can send a request to the assistant engine 130 to display the options bar in response to detecting the selection.

At stage 230, the assistant engine 130 can display the identified contacts 140 and a set of actions in the GUI 150. The action options can allow the user to interact with the identified contacts 140 in various ways. Some examples of actions options can include forwarding an email, sending an instant message, and setting up a meeting. In an example, the contacts 140 and actions can be displayed as selectable buttons or icons in the options bar. For example, the options bar can include a selectable icon for each contact 140 and action option. In one example, the action options can include sending an email to the selected client using an email template. For example, the assistant engine can provide an interface that allows the user to create an email template. The assistant engine can then include an icon on the options bar for sending an email to the selected contacts using the template.

At stage 240, the assistant engine 130 can receive a selection of at least one of the identified contacts 140. For example, the user can tap or click on an icon on the options bar corresponding to a contact 140. The user can select one or multiple contacts 140 in the options bar. In one example, the contacts can remain selected for multiple subsequent action selections. For example, the user can send an email and then also schedule or start a call without reselecting the contacts. In another example, after the selected action is performed, the contacts are deselected or the options bar refreshes to a default state with no selections indicated.

At stage 250, the assistant engine 130 can receive a selection of an action from the set of actions. For example, the user can tap or click on an icon on the options bar corresponding to an action option. In one example, the options bar can allow the user to select multiple action options. In another example, the user can also select other emails. For example, if a user decides to schedule a meeting or conference call, the assistant engine 130 can allow the user to select other emails that relate to the meeting. The email application 120 can create a meeting and send invites to the select contacts 140, and the invites can include the selected emails. In one example where the meeting invite is sent as an email, the additional emails can be added to the email as attachments or the additional emails can be stored in cloud storage and the email can includes links to the emails. In another example where the user schedules or initiates a web conference or other type of video call, the emails can be assistant engine can provide the emails to a web conferencing service, and the web conference service can provide the emails to the attendees through the service, such as through an Application Programming Interface ("API").

At stage 260, the assistant engine 130 can perform the selected action on the selected contact 140. In one example, this can include instructing the email application 120 to perform the selected action. In another example, the assistant engine 130 can display the options bar and the email application 130 can receive the selection inputs. The email application 130 can execute the selected actions and instruct the assistant engine 130 to hide the options bar.

As an example, the user can select an email using a predefined input type that causes the assistant engine 130 to display the options bar. The user can select one or more of the displayed contacts 140 and select an action option icon for forwarding the email. The email application 120 can then forward the email to the selected contacts 140. In another example, the user can select one or more contacts 140 and select an action option for scheduling a meeting. In response, the assistant engine 130 can display a scheduling window that allows the user to configure the meeting, such as choosing a meeting type (e.g., in-person, phone conference, video call), date, time, and select other contacts 140 to invite. In another example, the user can start a web conference with the selected contacts. In another example, the assistant engine 130 can communicate with a phone service to allow users to call contacts 140 on the options bar. For example, when the user selects a phone call action option, the assistant engine 130 can send the selected contact's 140 phone number to the phone service, and the phone service can then call the selected contact 140. Where the user device 110 is a mobile device, such as a cellular device, assistant engine 130 can cause the mobile device to call the selected contact 140. In an example where the user device 110 is a personal computer, the assistant engine 130 can cause a mobile device or a telephone of the user to call the selected contact 140.

In one example, the user can send a meeting invite by only selecting a contact and a meeting action button. As an example, the user can receive an email that is an invitation to a meeting. The assistant engine 130 can analyze the email, the metadata, or both to identify the email as a meeting invite. In one example, the assistant engine 130 can apply natural language processing algorithms to identify key words in the email known to be included in meeting invites. The assistant engine 130 can display an action option in the options bar for forwarding the meeting invite. In one example, the email application 120 can include a feature where it stores a list of invitees that the host or other invitees can view. In such an example, the email assistant 130 can notify the email server 160 that the selected contact has been invited to the meeting, which can cause the email server 160 to add the selected contact to the invitee list.

Figure 3:
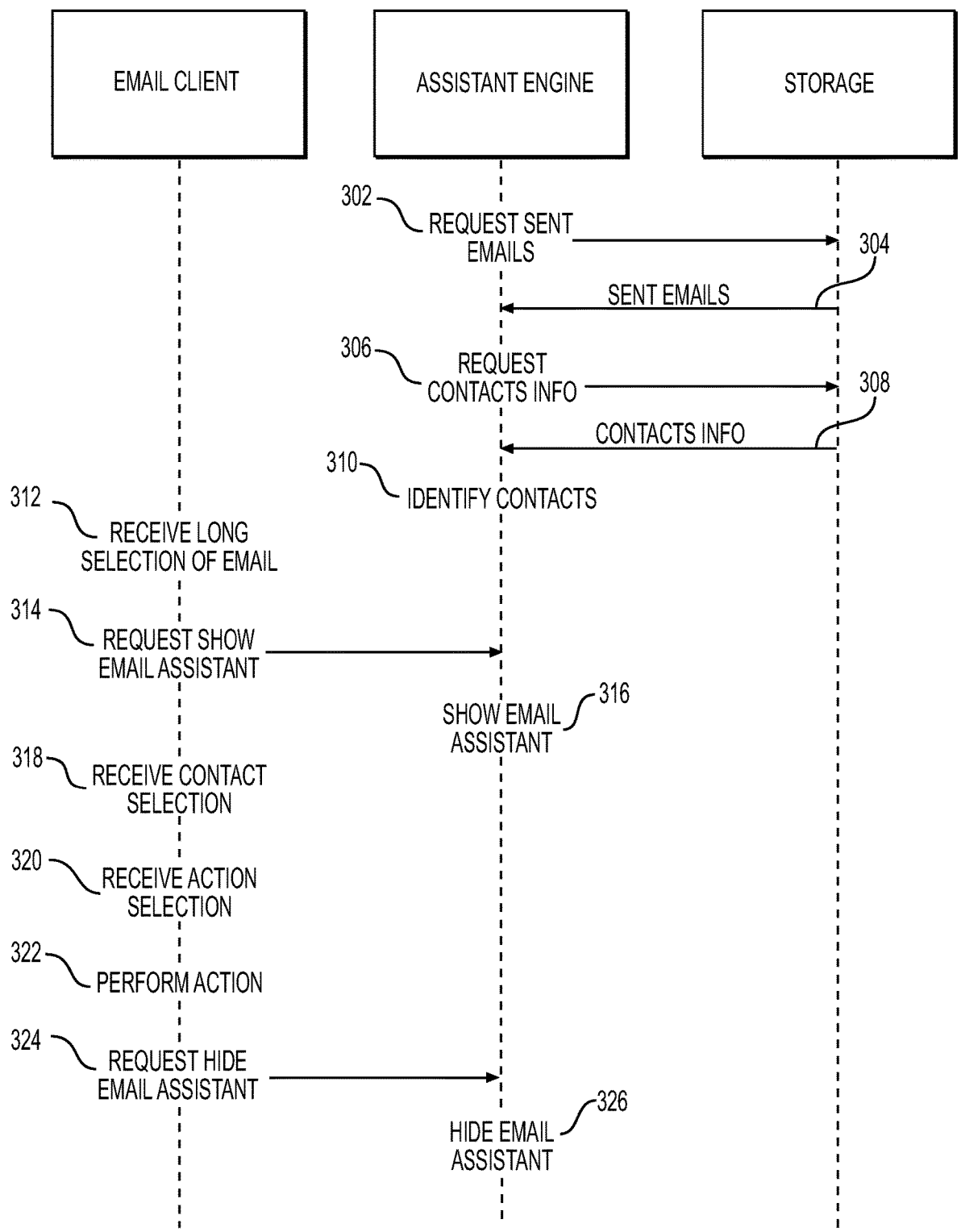
FIG. 3 is a sequence diagram of an example method for providing an email assistant options bar.

FIG. 3 is a sequence diagram of an example method for providing an email assistant options bar. At stage 302, the assistant engine 130 can request sent emails from a storage component. In one example, the storage component can be on the user device 110, such as a hard drive. For example, the email application 120, or another application that manages the user's contacts 140, can store the user's emails locally on the hard drive of the user device 110. Alternatively, the storage component can be on the email server 160. For example, the email server 160 can store and manage the user's emails.

At stage 304, the storage component can provide the sent emails to the assistant engine 130. In an example, the storage component can send the sent emails as data files, such as an EML file. In another example, the storage component can provide just the metadata of the sent emails. For example, the storage component can send metadata indicating the recipient contact 140 and a timestamp of emails sent from the user's email address. The assistant engine 130 can use this information to determine which contacts 140 the user has emailed the most over a predetermined time period.

At stage 306, the assistant engine 130 can request information of the user's contacts 140 from the storage component. In one example, the contacts 140 can be email contacts associated with the user's email profile. The storage component that stores the contacts information can be on the user device 110 or on an external device like the email server 160. The contact information can include the name, phone number, email address, department, and other details of another user. At stage 308, the storage component can provide the contacts information to the assistant engine 130. In one example, the contact information can be a data file, such as a virtual contact file ("VCF" or ".vcf").

In one example, the assistant engine 130 can retrieve other information about the user's interactions with the contacts 140 as well. For example, the assistant engine 130 can retrieve information on phone calls, video conference calls, jointly scheduled meetings, and so on. This information can be used to identify which contacts 140 that the user interacts with the most frequently.

At stage 310, the assistant engine 130 can identify a set of the contacts based on a set of rules. The set of rules can be used to determine which contacts 140 that the user interacts with the most frequently. The rules can be determined by the user, an administrator user, a machine learning algorithm, or a combination of these, depending on the example. For example, an administrator can set a base set of rules, a machine learning algorithm can refine the rules based on user actions, and the user can add or remove contacts 140 from the options bar manually.

In some examples, the assistant engine can select contacts for the options bar based on criteria unrelated to interaction frequency. For example, the assistant engine can identify contacts that the user has most recently interacted with. As an example, the assistant engine can identify the last five contacts the user has emailed, or the last five contacts the user has emailed or received an email from. Although five contacts is described for the number of identified contacts, other contact amounts can be used, such as three or seven. The number of identified contacts 140 can correspond to the number of contact spaces available in the options bar.

The contacts 140 for the options bar can be identified based on a variety of factors. In one example, the identified contacts 140 can be the contacts 140 that the user has sent the most emails to. For example, the assistant engine 130 can count the number of emails the user has sent to each contact 140 and identify the contacts 140 with the highest count. In another example, the assistant engine 130 can also count received emails from each contact 140. The assistant engine 130 can also include other contact methods, such as phone calls, scheduled meetings, instant messages, and video calls. In one example, the assistant engine 130 can assign weights to interaction types and determine a weighted score for each contact 140. The contacts 140 with the highest scores can be placed in the options bar.

At stage 312, the email application 120 can receive a long selection of an email. Although a long press is described, the email application 120 can receive any type of predetermined input that corresponds to displaying the options bar, such as a drag, double tap, or a selection of a button corresponding to the options bar. In an example, a long press can occur when a user touches or clicks and holds on the email for more than a predetermined time, such as one second.

At stage 314, the email application 120 can send a request to the assistant engine 130 to show the email assistant. In one example, the assistant engine 130 can be subscribed to long email press events that occur in the email application. When the user performs the long press, the email application 120 can post a long event of the long press, which the assistant engine 130 can receive. In response, at stage 316, the assistant engine 130 can show the options bar in the GUI 150.

At stage 318, the email application 120 can receive a selection of a contact 140 on the options bar. For example, the options bar can display icons corresponding to the contacts 140 that the user has interacted with the most frequently based on the set of rules. The user can tap or click on an icon to select the corresponding contact 140. In one example, the user can select multiple contacts 140 in the options bar.

At stage 320, the email application 120 can receive a selection of an action on the options bar. For example, the options bar can also include icons for certain actions that can be performed, such as forwarding the email, scheduling a meeting, scheduling or initiating a conference or video call, making a phone call, or sending an instant message. In one example, the action options can include sending an email to the selected client using an email template. For example, the assistant engine can provide an interface that allows the user to create an email template. The assistant engine can then include an icon on the options bar for sending an email to the selected contacts using the template. The user can tap or click on an action option to interact with the contact 140 using the corresponding method. In one example, the options bar can allow the user to select multiple action options. In another example, the user can also select other emails. For example, if a user decides to schedule a meeting or conference call, the assistant engine 130 can allow the user to select other emails that relate to the meeting. The email application 120 can create a meeting and send invites to the select contacts 140, and the invites can include the selected emails. In one example where the meeting invite is sent as an email, the additional emails can be added to the email as attachments or the additional emails can be stored in cloud storage and the email can includes links to the emails. In another example where the user schedules or initiates a web conference or other type of video call, the emails can be assistant engine can provide the emails to a web conferencing service, and the web conference service can provide the emails to the attendees through the service, such as through an Application Programming Interface ("API").

At stage 322, the email application 120 can perform the selected action. The action can be directed at the selected contact 140. For example, where the user selects a phone call action, the email application 120 can send instructions to a phone associated with the user's profile to dial the contact's number. Where the user selects a video call action, the assistant engine 130 can launch an associated video call application on the user device 110 can initiate a video call with the selected contact. Where the user selects a forward email option, the email application 120 can forward the selected email to all the selected contacts 140. Where the user selects a meeting option, the email application 120 can display a window where the user can input the meeting details, such as the data and time. In one example, the email application 120 can prepopulate the meeting invite with the selected contacts 140 as invitees. In another example, the email application can attach the selected email as an attachment for the meeting invite. In still another example, the email application 120 can allow the user to select other emails to include in the invite.

Although stages 318, 320, and 322 are described as being performed by the email application 120, in some examples they can be performed by the assistant engine 130. For example, the assistant engine can receive the contact 140 and action selections, and then perform the corresponding action. Performing the corresponding action by the assistant engine 120 can include instructing the email application 120 to perform the action. For example, the assistant engine 130 can send instructions to the email application 120 to forward the email to the selected contact 140, open a new email window where the user can send a new email to the selected contact 140, call the selected contact 140, schedule a meeting with the contact 140, or initiate a web conference meeting with the contact 140.

At stage 324, the email application 120 can send a request to the assistant engine 130 to hide the email assistant. At stage 326, the assistant engine 130 can hide the email assistant on the GUI 150. In one example, the options bar can remain displayed on the GUI 150 of the email application 120. This can allow the user to select additional actions from the options bar. The user can toggle the options bar remaining displayed in a settings menu, in an example.

Figure 4:
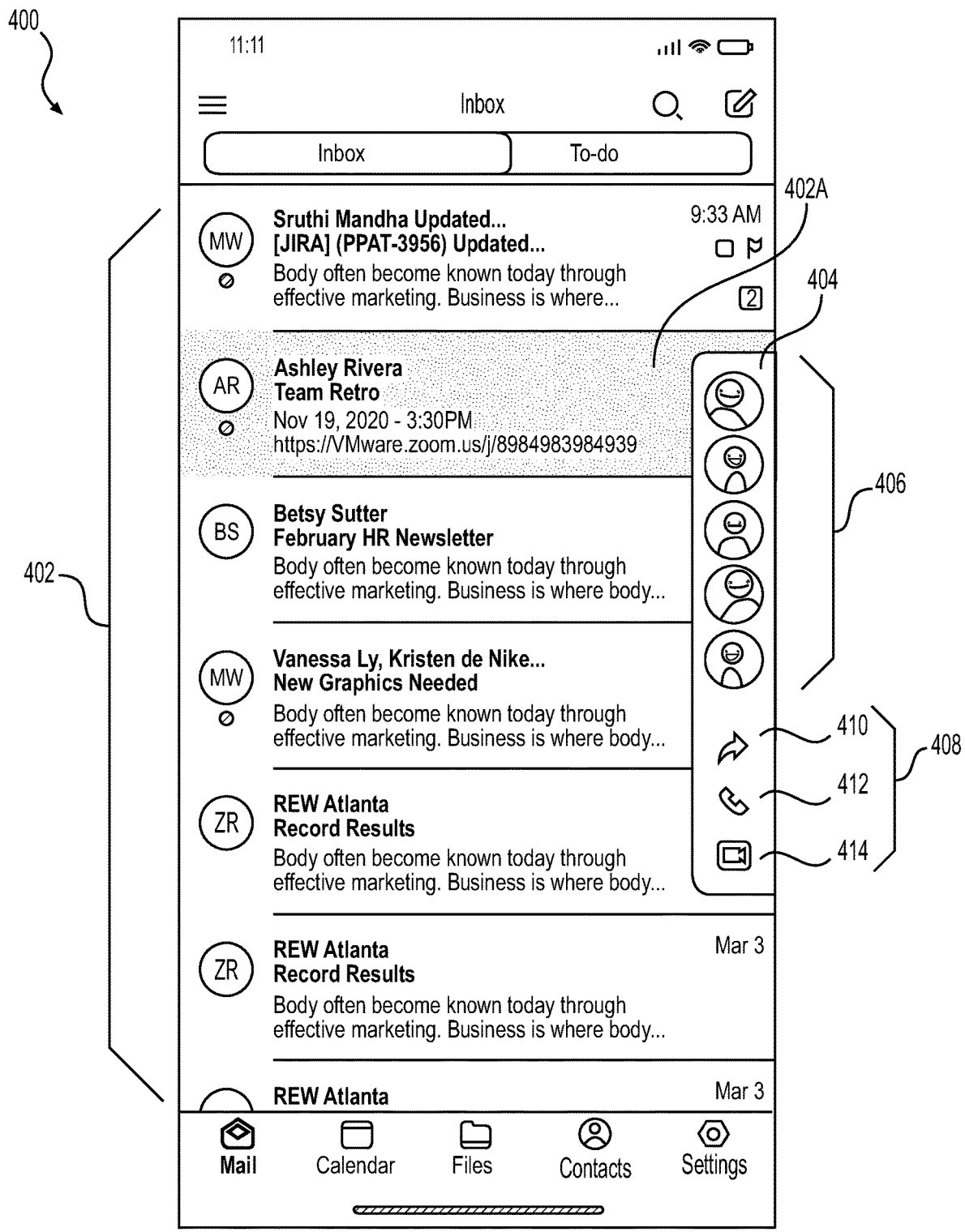
FIG. 4 is an illustration of an example graphical user interface ("GUI") of a display used to providing an email assistant options bar.

FIG. 4 is an illustration of an example graphical user interface ("GUI") 400 of a display of the email application 120 that includes an email options bar. The GUI 400 displays emails 402 of the user's inbox. In the GUI 400, the user has performed a predetermined input on selected email 402A for displaying the options bar 404. For example, the user can perform a long press on the selected email 402A, and in response the assistant engine 130 can display the options bar 404 for the selected email 402A.

The options bar 404 includes identified contacts 406. The identified contacts 406 can be contacts that the assistant engine 130 identified based on a set of rules. The set of rules can be designed to identify the contacts 140 that the user is most likely to want to interact with from within the email application 120. In one example, the assistant engine 130 can execute rules to determine which contacts should be included in the options bar 404 when the user loads the email application 120. The identified contacts 406 are shown in GUI 400 as images of the contacts 140, but the contacts 140 can be shown using other information, such as a name, initials, or contact information.

The options bar 404 also includes action options 408. The action options 408 that the user can select in the options bar 404 include an email forward option 410, phone call option 412, and a video conference option 414. The action options 408 shown in the GUI 400 are merely examples, and other action options can be used, such as scheduling or starting a meeting, sending an email from a template, or sending an instant message. In one example, the action options can include sending an email to the selected client using an email template. For example, the assistant engine can provide an interface that allows the user to create an email template. The assistant engine can then include an icon on the options bar for sending an email to the selected contacts using the template. The user can populate the options bar with actions for sending multiple different email templates, such that each email template has its own respective action icon. This can allow a user to quickly create emails when they are repeatedly sending out a couple different template emails as part of their job.

In one example, the action options 408 can be unselectable until the user selects a contact 406. For example, the assistant engine 130 can grey out the icons for the action options 408 and ignore any selection of the action options 408 unless a contact 406 has been selected. In an example, the assistant engine 130 can allow the user to select other emails 402 to include with the action option 408. In one such example, the assistant engine 130 can allow the user to select another email only when certain action options 408 are selected. For example, the assistant engine 130 can allow the user to selected multiple emails to include in a meeting invite, but not for a phone call.

In an example, the assistant engine 110 can provide a configuration window that allows the user to customize the options bar. In one example, the assistant engine 130 can provide an interface that allows the user to customize how the contacts 140 included in the options bar are identified. For example, the user can configure whether assistant engine 130 considers the contacts the user can interacted with the most frequently over a time period or the contacts the user can interacted with the most recently. The user can also configure which interaction types the assistant engine 130 uses to identify contacts, such as sent emails, received emails, phone calls, video calls, meetings, and so on. In one example, the user can select contacts 140 that should always or never appear in the options bar. In another example, the user can customize the number of contacts that are displayed in the options bar.

In an example, the configuration window can also allow the user to customize action options. In one example, the user can select action options that should always or never appear in the options bar. In another example, the user can customize the number of action options that are displayed in the options bar. The user can also configure individual action options. For example, the user can customize whether a video call button initiates a video call or schedules a video call. The user can do the same for a phone call button. In another example, the user can create a message that the email application 120 inserts into the body of emails forwarded using the options bar. In another example, as described previously, the user can create a template for a custom email that can be sent by selecting a corresponding action option icon.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing an email assistant options bar, comprising:

identifying, based on a set of rules, a set of contacts from a plurality of contacts associated with a user profile;
receiving a selection of an email;
determining that the email includes an invitation for a meeting;
displaying, on a single screen in a graphical user interface ("GUI"), the email assistant options bar, the email assistant options bar including the set of contacts and a set of actions displayed within a same view of the email assistant options bar, wherein the set of actions includes an action for adding contacts to an invitee list for the meeting;
receiving a selection of a plurality of contacts at least one contact from the set of contacts;
receiving a selection of the action for adding contacts to the invitee list for the meeting; and
performing the selected action by adding the selected plurality of contacts to the invitee list.

2. The method of claim 1, wherein the set of actions includes at least two of forwarding the email, scheduling a video conference meeting, initiating a video conference call, scheduling a conference call, calling the selected contacts, and sending a new email to the selected contacts.

3. The method of claim 1, wherein the email assistant options bar is displayed in the GUI in response to the selection of the email being longer than one second.

4. The method of claim 1, wherein the set of rules includes determining a number of emails sent from an email address associated with the user profile to each of the plurality of contacts associated with the user profile, and wherein the identified set of contacts are selected based on the email address sending those contacts a relative highest number of emails over a predetermined time.

5. The method of claim 1, wherein the set of actions includes multiple icons for sending emails, each corresponding to a different email template.

6. The method of claim 1, wherein the set of rules includes at least one of determining a number of emails received by an email address associated with the user profile from each of the plurality of contacts associated with the user profile and determining a number of phone calls between the user profile and each of the plurality of contacts associated with the user profile of a period of time.

7. The method of claim 1, wherein at least one of the set of actions allows additional emails to be selected and attached to a meeting invitation for a meeting.

8. A non-transitory, computer-readable medium containing instructions that, when executed by a hardware-based processor, performs stages for providing an email assistant options bar, the stages comprising:

identifying, based on a set of rules, a set of contacts from a plurality of contacts associated with a user profile;
receiving a selection of an email;
determining that the email includes an invitation for a meeting;
displaying, on a single screen in a graphical user interface ("GUI"), the email assistant options bar, the email assistant options bar including the set of contacts and a set of actions displayed within a same view of the email assistant options bar, wherein the set of actions includes an action for adding contacts to an invitee list for the meeting determined to be included in the email;
receiving a selection of a plurality of contacts from the set of contacts;
receiving a selection of the action for adding contacts to the invitee list for the meeting; and performing the selected action by adding the selected plurality of contacts to the invitee list.

9. The non-transitory, computer-readable medium of claim 8, wherein the set of actions includes at least two of forwarding the email, scheduling a video conference meeting, initiating a video conference call, scheduling a conference call, calling the selected contacts, and sending a new email to the selected contacts.

10. The non-transitory, computer-readable medium of claim 8, wherein the email assistant options bar is displayed in the GUI in response to the selection of the email being longer than one second.

11. The non-transitory, computer-readable medium of claim 8, wherein the set of rules includes determining a number of emails sent from an email address associated with the user profile to each of the plurality of contacts associated with the user profile, and wherein the identified set of contacts are selected based on the email address sending those contacts a relative highest number of emails over a predetermined time.

12. The non-transitory, computer-readable medium of claim 11, wherein the set of actions includes multiple icons for sending emails, each corresponding to a different email template.

13. The non-transitory, computer-readable medium of claim 8, wherein the set of rules includes at least one of determining a number of emails received by an email address associated with the user profile from each of the plurality of contacts associated with the user profile and determining a number of phone calls between the user profile and each of the plurality of contacts associated with the user profile of a period of time.

14. The non-transitory, computer-readable medium of claim 8, wherein at least one of the set of actions allows additional emails to be selected and attached to a meeting invitation for a meeting.

15. A system for providing an email assistant options bar, comprising:
a memory storage including a non-transitory, computer-readable medium comprising instructions; and
a computing device including a hardware-based processor that executes the instructions to carry out stages comprising:
identifying, based on a set of rules, a set of contacts from a plurality of contacts associated with a user profile;
receiving a selection of an email;
determining that the email includes an invitation for a meeting;
displaying, on a single screen in a graphical user interface ("GUI"), the email assistant options bar, the email assistant options bar including the set of contacts and a set of actions displayed within a same view of the email assistant options bar, wherein the set of actions includes an action for adding contacts to an invitee list for the meeting;
receiving a selection of a plurality of contacts from the set of contacts;
receiving a selection of the action for adding contacts to the invitee list for the meeting; and
performing the selected action by adding the selected plurality of contacts to the invitee list.

16. The system of claim 15, wherein the set of actions includes at least two of forwarding the email, scheduling a video conference meeting, initiating a video conference call, scheduling a conference call, calling the selected contacts, and sending a new email to the selected contacts.

17. The system of claim 15, wherein the email assistant options bar is displayed in the GUI in response to the selection of the email being longer than one second.

18. The system of claim 15, wherein the set of rules includes determining a number of emails sent from an email address associated with the user profile to each of the plurality of contacts associated with the user profile, and wherein the identified set of contacts are selected based on the email address sending those contacts a relative highest number of emails over a predetermined time.

19. The system of claim 15, wherein the set of actions includes multiple icons for sending emails, each corresponding to a different email template.

20. The system of claim 15, wherein the set of rules includes at least one of determining a number of emails received by an email address associated with the user profile from each of the plurality of contacts associated with the user profile and determining a number of phone calls between the user profile and each of the plurality of contacts associated with the user profile of a period of time.

* * * * *